(12) United States Patent
Shiimoto et al.

(10) Patent No.: US 9,311,934 B1
(45) Date of Patent: Apr. 12, 2016

(54) SYMMETRICAL STO FOR OSCILLATION WITH BOTH POLARITY BIAS

(71) Applicant: HGST Netherlands B.V., Amsterdam (NL)

(72) Inventors: Masato Shiimoto, Fujisawa (JP); Masashige Sato, Atsugi (JP); Masukazu Igarashi, Kawagoe (JP); Yo Sato, Odawara (JP); Masato Matsubara, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/808,693

(22) Filed: Jul. 24, 2015

(51) Int. Cl.
*G11B 5/147* (2006.01)

(52) U.S. Cl.
CPC ........................... *G11B 5/147* (2013.01)

(58) Field of Classification Search
CPC .......... G11B 5/127; G11B 5/147; G11B 5/33
USPC ................. 360/125.1–125.7, 125.31–125.35
See application file for complete search history.

(56) References Cited

U.S. PATENT DOCUMENTS

| | | | |
|---|---|---|---|
| 8,208,219 B2 | 6/2012 | Zhang et al. | |
| 8,274,811 B2 | 9/2012 | Zhang et al. | |
| 8,582,240 B1* | 11/2013 | Chen | G11B 5/399 360/125.3 |
| 8,634,163 B2 | 1/2014 | Tanabe et al. | |
| 8,755,150 B2 | 6/2014 | Chen et al. | |
| 8,953,273 B1* | 2/2015 | Funayama | G11B 5/012 360/46 |
| 9,111,552 B1* | 8/2015 | Takeo | G11B 5/127 |
| 2010/0232053 A1* | 9/2010 | Yano | G11B 5/02 360/75 |
| 2011/0038080 A1* | 2/2011 | Alex | G11B 5/02 360/123.02 |
| 2011/0038081 A1* | 2/2011 | Contreras | B82Y 25/00 360/125.03 |
| 2011/0242701 A1* | 10/2011 | Ohtake | B82Y 10/00 360/99.08 |
| 2012/0113542 A1 | 5/2012 | Igarashi et al. | |
| 2013/0215530 A1* | 8/2013 | Igarashi | G11B 5/1278 360/59 |
| 2014/0133048 A1 | 5/2014 | Shiimoto et al. | |
| 2014/0177100 A1 | 6/2014 | Sugiyama et al. | |

OTHER PUBLICATIONS

Sato, et al.; Thin Spin-Torque Oscillator With High AC-Field for High Density Microwave-Assisted Magnetic Recording; date unknown; 1 page.

\* cited by examiner

*Primary Examiner* — Allen T Cao
(74) *Attorney, Agent, or Firm* — Patterson & Sheridan, LLP

(57) ABSTRACT

Embodiments disclosed herein generally relate to a MAMR head. The MAMR head includes an STO and a current switching system electrically coupled to the STO. The current switching system can be used to optimize the STO frequency by changing the STO bias polarity, i.e., by changing the direction of the current flowing to the STO. As a result, the difference between the STO frequency and the magnetic media frequency is minimized, which improves recording capability of the MAMR head.

20 Claims, 5 Drawing Sheets

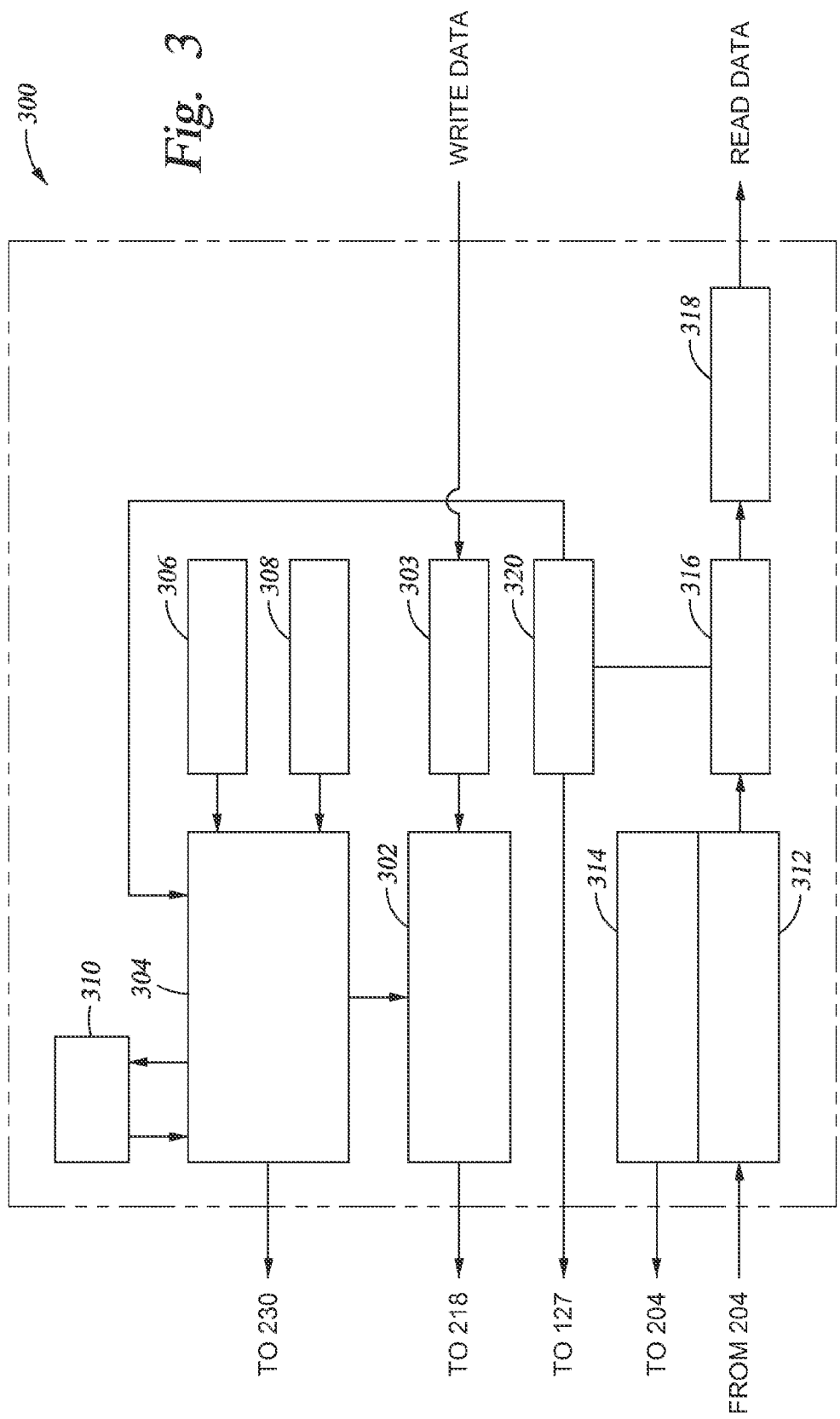

US 9,311,934 B1

SYMMETRICAL STO FOR OSCILLATION WITH BOTH POLARITY BIAS

BACKGROUND

1. Field

Embodiments disclosed herein generally relate to a magnetic disk device employing a microwave assisted magnetic recording (MAMR) head.

2. Description of the Related Art

Over the past few years, MAMR has been studied as a recording method to improve the areal density of a magnetic read/write device, such as a hard disk drive (HDD). MAMR enabled magnetic recording heads utilize a spin torque oscillator (STO) for generating a microwave (high frequency AC magnetic field). When the magnetic field from the write head is applied and current is conducted to the STO, the STO oscillates and may provide an AC magnetic field to the recording medium. The AC magnetic field may reduce the coercive force of the recording medium, thus high quality recording by MAMR may be achieved. Typically the STO includes a spin polarization layer (SPL), a field generation layer (FGL) and an interlayer disposed between the SPL and the FGL. The STO generates high frequency magnetic fields, or microwaves, as a result of the transfer of spin torque from the SPL through the interlayer to the FGL, and the in-plane high speed rotation of the magnetization of the FGL serves as the in-plane free layer.

In MAMR, optimizing STO frequency is difficult since the frequency margin for high gain is low. A typical MAMR head has a large distribution in STO frequency because the STO frequency depends on the writer dimensions as well as the STO dimensions. Conventionally the current applied to the STO flows in one-way direction, and STO bias optimization is not effective for optimizing STO frequency because the dependency of frequency on STO bias has a step-like behavior.

Therefore, there is a need in the art for an improved recording head for MAMR.

SUMMARY

Embodiments disclosed herein generally relate to a MAMR head. The MAMR head includes an STO and a current switching system electrically coupled to the STO. The current switching system can be used to optimize the STO frequency by changing the STO bias polarity, i.e., by changing the direction of the current flowing to the STO. As a result, the difference between the STO frequency and the magnetic media frequency is minimized, which improves recording capability of the MAMR head.

In one embodiment, a hard disk drive includes a magnetic media a magnetic read head, and a magnetic write head. The magnetic write head includes a main pole, a trialing shield, and an STO disposed between the main pole and the trailing shield. The hard disk drive further includes a circuit electrically coupled to the magnetic read head of the magnetic write head, and the circuit includes a current switching system electrically coupled to the STO.

In another embodiment, a method includes flowing a current to an STO. The current is flowed to the STO in a first direction. The method further includes changing the flow of the current to the STO, and the current is flowed to the STO in a second direction. The second direction is opposite the first direction.

In another embodiment, a method includes flowing a current to an STO disposed between a main pole and a trailing shield. The current is flowed from the main pole to the trailing shield. The method further includes changing the flow of the current to the STO, and the current is flowed to the STO from the trailing shield to the main pole.

In another embodiment, a magnetic head includes a main pole, a trailing shield, and an STO disposed between the main pole and the trailing shield. The STO is electrically connected to a current switching system.

BRIEF DESCRIPTION OF THE DRAWINGS

So that the manner in which the above recited features can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

FIG. 3 is a schematic circuit diagram of the MAMR/read/write head, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s).

Embodiments disclosed herein generally relate to a MAMR head. The MAMR head includes an STO and a current switching system electrically coupled to the STO. The current switching system can be used to optimize the STO frequency by changing the STO bias polarity, i.e., by changing the direction of the current flowing to the STO. As a result, the difference between the STO frequency and the magnetic media frequency is minimized, which improves recording capability of the MAMR head.

Figure 1:
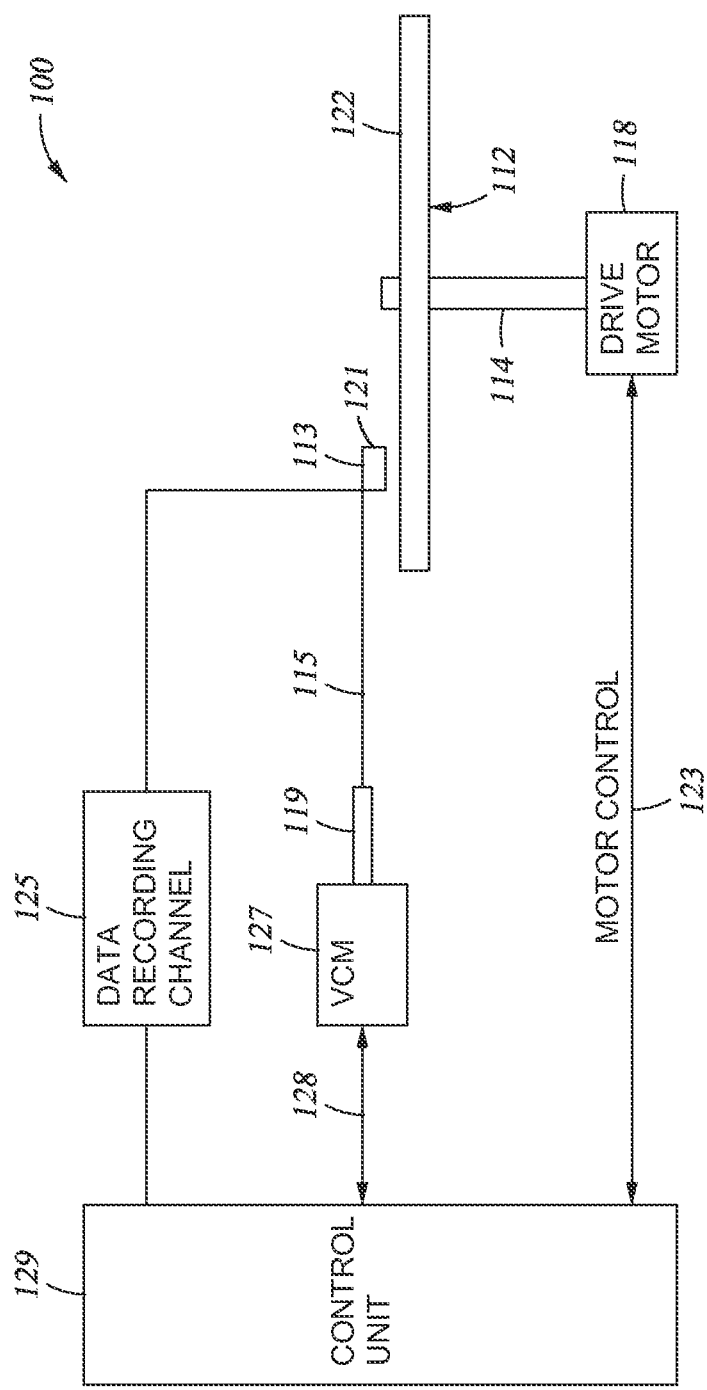
FIG. 1 illustrates a disk drive system, according to embodiments described herein.

FIG. 1 illustrates a disk drive 100 according to embodiments described herein. As shown, at least one rotatable magnetic media, such as a magnetic disk 112, is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121 that may include an STO for applying an AC magnetic field to the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the MAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk surface 122 by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
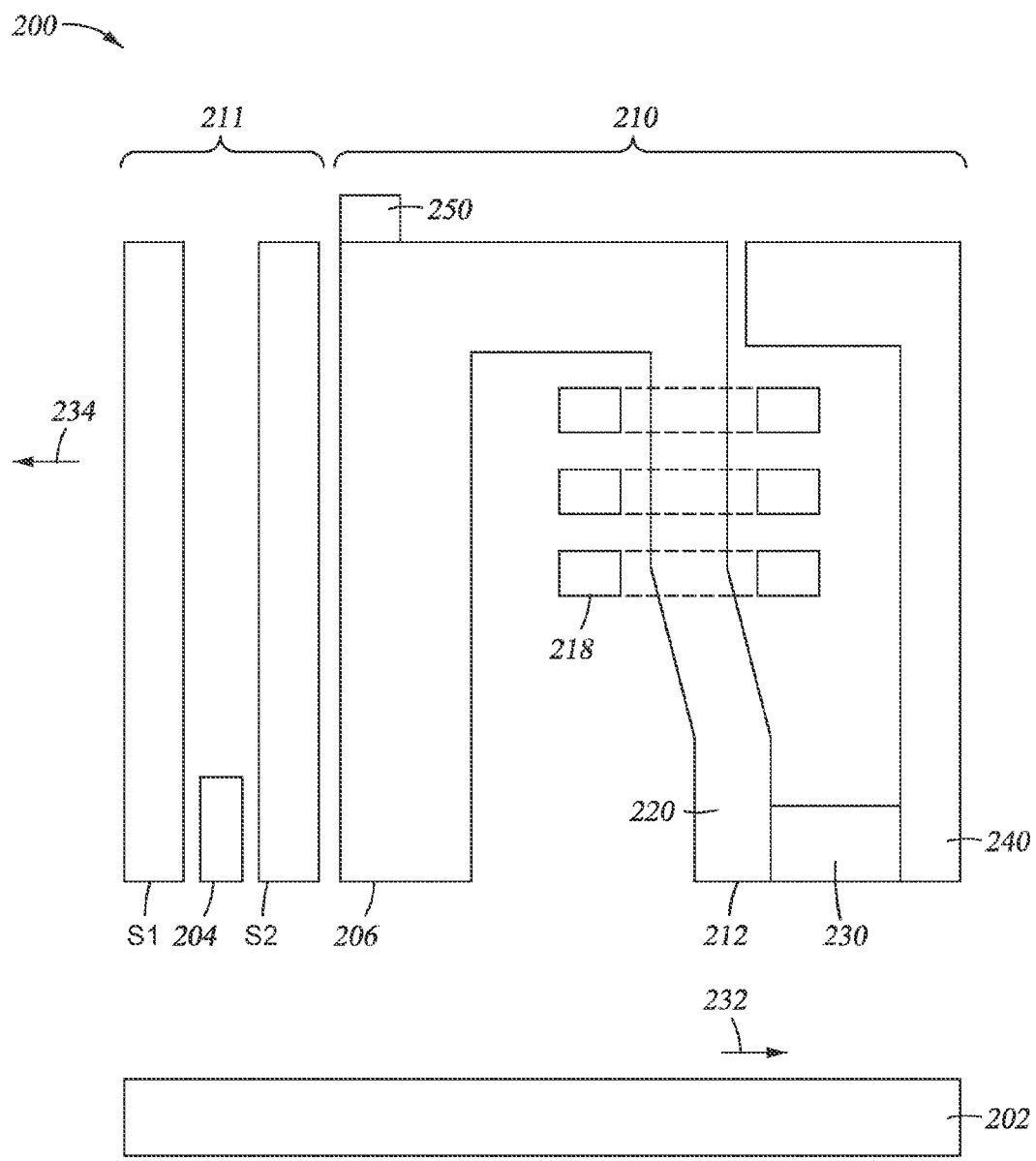
FIG. 2 is a cross sectional view of a MAMR read/write head and magnetic disk of the disk drive system of FIG. 1, according to embodiments described herein.

FIG. 2 is a fragmented, cross sectional side view through the center of a MAMR read/write head 200 facing a magnetic disk 202. The read/write head 200 and magnetic disk 202 may correspond to the magnetic head assembly 121 and magnetic disk 112, respectively in FIG. 1. The read/write head 200 includes a media facing surface (MFS) 212, such as an ABS, a magnetic write head 210 and a magnetic read head 211, and is mounted such that the MFS 212 is facing the magnetic disk 202. In FIG. 2, the disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 202 are detectable by the MR (or MTJ) sensing element 204 as the recorded bits.

The write head 210 includes a return pole 206, a main pole 220, a trailing shield 240, an STO 230 disposed between the main pole 220 and the trailing shield 240, and a coil 218 that excites the main pole 220. A recording magnetic field is generated from the main pole 220 and the trailing shield 240 helps making the magnetic field gradient of the main pole 220 steep. The main pole 220 may be a magnetic material such as a CoFe alloy. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

The main pole 220, the trailing shield 240 and the STO 230 all extend to the MFS 212, and the STO 230 disposed between the main pole 220 and the trailing shield 240 is electrically coupled to the main pole 220 and the trailing shield 240. The STO 230 may be surrounded by an insulating material (not shown) in a cross-track direction (into and out of the paper). During operation, a current is applied to the STO 230 to generate an AC magnetic field that travels to the magnetic disk 202 to lower the coercivity of the region of the magnetic disk 202 adjacent to the STO 230. The direction of the current applied to the STO 230 may be reversed during operation in order to optimize the frequencies of the STO 230. The current flowed to the STO 230 at a first direction may be referred to as applying a positive polarity bias to the STO 230, and the current flowed to the STO 230 at a second direction which is the reverse direction of the first direction may be referred to as applying a negative polarity bias to the STO 230. The STO 230 can oscillate at both positive and negative polarities and achieve different frequencies. The write head 210 further includes a heater 250 for adjusting the distance between the read/write head 200 and the magnetic disk 202. The location of the heater 250 is not limited to above the return pole 206, as shown in FIG. 2. The heater 250 may be disposed at any suitable location.

FIG. 3 is a schematic diagram of a circuit 300 of the MAMR read/write head 200, according to one embodiment. The circuit 300 may be electrically coupled to the read head 211 and the write head 210. The circuit 300 may include a write circuit 302 for receiving write data and sending the write data to the coil 218. The write data may be supplied by the control unit 129 and processed by a data processor 303 before reaching the write circuit 302. The data processor 303 may be any suitable data processor. The circuit 300 further includes a current switching system 304 electrically coupled to the STO 230. The current switching system 304 is capable of reversing the current flow to the STO 230 during operation. A positive STO circuit 306 and a negative STO circuit 308 may be electrically coupled to the current switching system 304. The positive STO circuit 306 may be configured to supply a current to the STO 230 in a first direction, the negative STO circuit 308 may be configured to supply a current to the STO 230 in a second direction, and the first direction is the opposite of the second direction, i.e., the second direction is the reverse of the first direction. A timer 310 may be electrically coupled to the current switching system 304 to assist with the switching of the flow of the current supplied to the STO 230. In some embodiments, the flow of the current supplied to the STO 230 may be reversed based on time during operation, and the timer 310 counts the operating time and instructs the current switching system 304 to switch the direction of the current flowing to the STO 230 at a predetermined time. In some embodiments, the flow of the current supplied to the STO 230 may be switched based on the track of the magnetic disk 112 to be written. For example, for tracks having odd track numbers, the current supplied to the STO 230 is flowing in the first direction, and for tracks having even track numbers, the current supplied to the STO 230 is switched to the second direction, which is opposite the first direction. To further optimize the frequency of the STO 230, the STO bias power generated from the STO circuits 306, 308, the write current generated by the write circuit 302, the write timing, and the write waveform may be appropriately controlled for each flow direction of the current supplied to the STO 230.

The circuit 300 may further include a sensor bias circuit 314 for supplying a current to the MR sensing element or MJT sensing device 204. A preamp 312 may be coupled to the sensor bias circuit 314 for obtaining the read signal from the MR sensing element or MJT sensing device 204. The preamp 312 sends the read signal to a read signal processor 316 which in turn sends the processed read signal to a data processor 318. The read signal processor 316 may also send a signal to a servo system 320 which controls the actuator means 127. The servo system 320 may provide a cylinder number signal to the current switching system 304. The data processor 318 processes the read signal and sends the read data to the control unit 129.

Figure 4A:
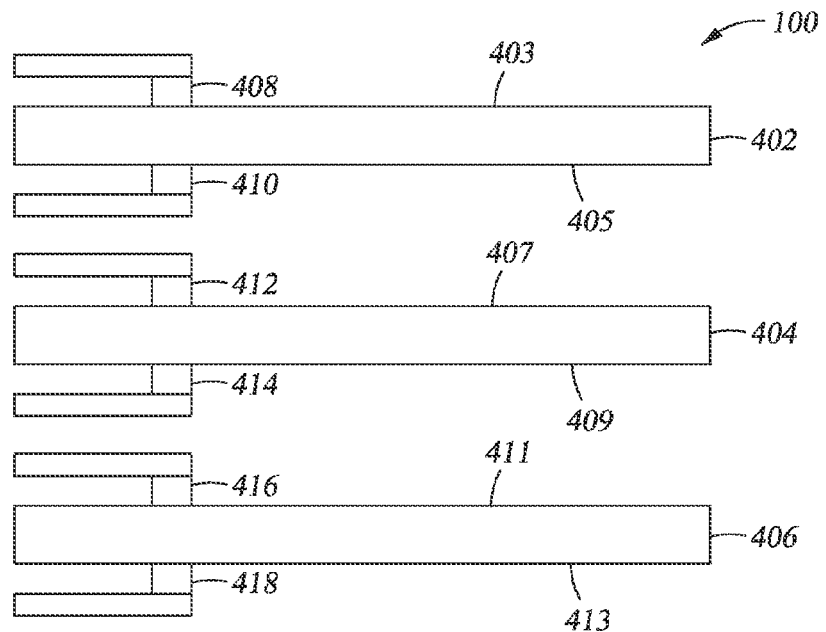
FIGS. 4A and 4B illustrate a method of optimizing STO frequency according to one embodiment.
Figure 4B:
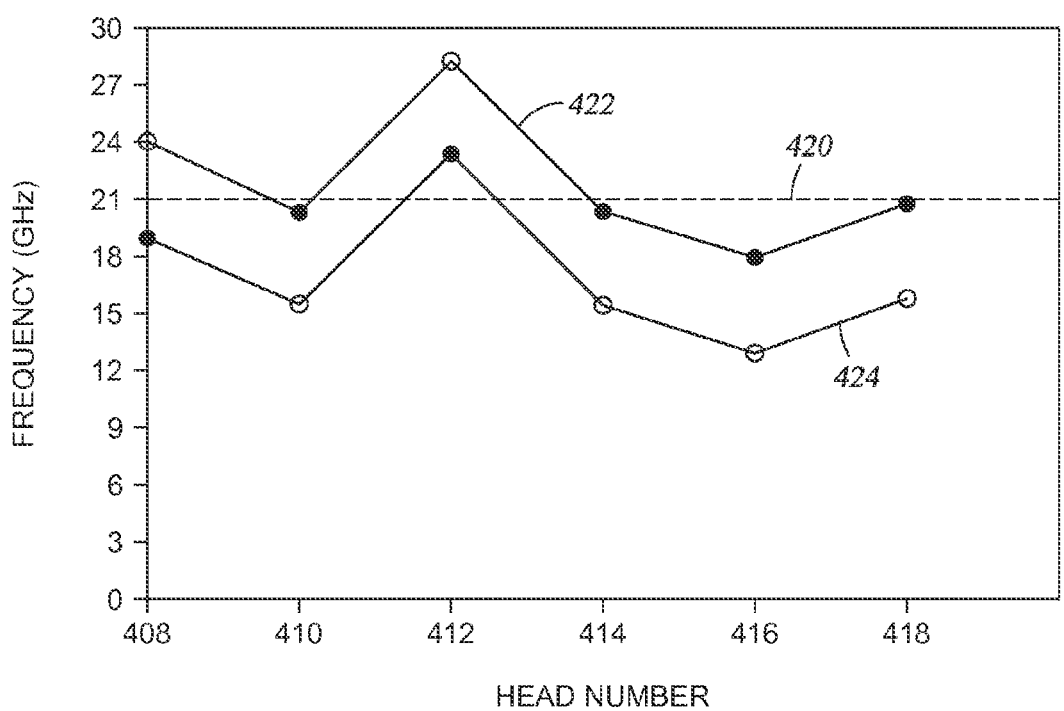

FIGS. 4A and 4B illustrate a method of optimizing STO frequency according to one embodiment. FIG. 4A is a schematic side view of a portion of the disk drive 100. As shown in FIG. 4A, the disk drive 100 includes three magnetic disks 402, 404, 406. Each magnetic disk 402, 404, 406 maybe the same as the magnetic disk 112. The disk drive 100 further includes magnetic heads 408, 410, 412, 414, 416, 418. Each magnetic head 408, 410, 412, 414, 416, 418 may be the same as the MAMR read/write head 200. The magnetic head 408 is configured to read and write data from and on a surface 403 of the magnetic disk 402. The magnetic head 410 is configured to read and write data from and on a surface 405 of the magnetic disk 402. The magnetic head 412 is configured to read and write data from and on a surface 407 of the magnetic disk 404. The magnetic head 414 is configured to read and write data from and on a surface 409 of the magnetic disk 404. The magnetic head 416 is configured to read and write data from and on a surface 411 of the magnetic disk 406. The magnetic head 418 is configured to read and write data from and on a surface 413 of the magnetic disk 406.

FIG. 4B is a chart showing the STO frequency of each magnetic head 408, 410, 412, 414, 416, 418 with positive polarity (current flowed to the STO in a first direction) on the STO and negative polarity (current flowed to the STO in a second direction which is the reverse of the first direction) on the STO. Line 420 represents the frequency of the magnetic disk 112, line 422 represents the STO frequency of the magnetic heads 408, 410, 412, 414, 416, 418 with positive polarity on the STO, and line 424 represents the STO frequency of the magnetic heads 408, 410, 412, 414, 416, 418 with negative polarity on the STO. If the magnetic heads 408, 410, 412, 414, 416, 418 all have positive polarity on the STO, the STO frequencies of certain magnetic heads, such as magnetic heads 408 and 412, deviate further from the frequency of the magnetic disk 112 than the STO frequencies of the same magnetic heads with negative polarity on the STO. Vice versa, the STO frequencies of magnetic heads 410, 414, 416, 418 with negative polarity on the STO deviate further from the frequency of the magnetic disk 112 than the STO frequencies of the same magnetic heads with positive polarity on the STO. Thus, by using certain magnetic heads, such as magnetic heads 410, 414, 416, 418, with positive polarity on the STO and certain magnetic heads, such as magnetic heads 408, 412, with negative polarity on the STO, as shown in FIG. 4B, it is possible to control the sweet spot frequency of the magnetic disk 112 by adjusting the variation in the STO frequencies among the magnetic heads.

Figure 5:
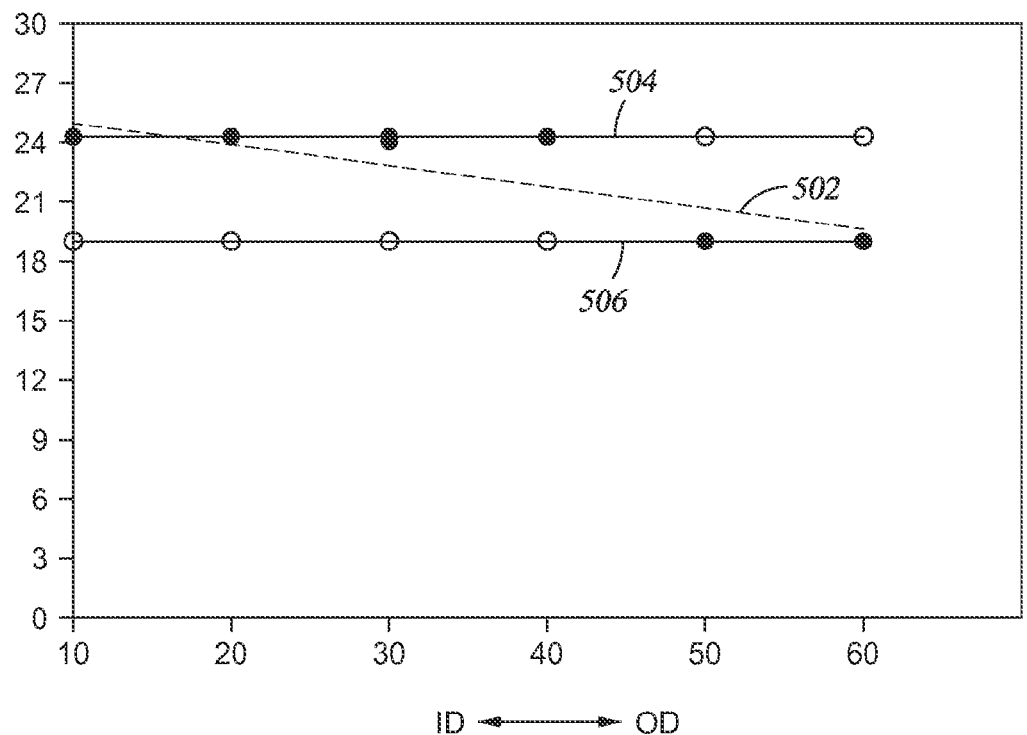
FIG. 5 illustrates a method of optimizing STO frequency according to another embodiment.

FIG. 5 illustrates a method of optimizing STO frequency according to another embodiment. The frequency of a magnetic disk, such as the magnetic disk 112, may not be constant across the disk surface due to the magnetic coercivity being smaller at the outside diameter (OD) region than the inside diameter (ID) region on the disk surface. Typically, the disk surface includes a plurality of concentric tracks, and the magnetic coercivity at each track may be different. FIG. 5 is a chart showing a relationship between frequency and tracks (six tracks are shown but there may be more or less than six). Each track has a track number which is based on the location of the track, such that the smaller the track number the closer the track to the ID. Line 502 represents the frequency of the magnetic disk across all of the tracks, line 504 represents the frequency of one magnetic head having positive polarity on the STO, and line 506 represents the frequency of the same magnetic head having negative polarity on the STO. As shown in FIG. 5, the frequencies of the magnetic disk are not the same from the ID region to the OD region. In order to provide STO frequencies that are as close to the frequencies of the magnetic disk as possible, the current applied to the STO during operation may change direction when the magnetic head is located over certain tracks. For example, as shown in FIG. 5, when the magnetic head is located over tracks 10, 20, 30, 40, positive polarity is applied to the STO of the magnetic head, i.e., the current flowed to the STO is in a first direction. As the magnetic head moves a location above track 50, the direction of the current flowed to the STO is reversed, i.e., negative polarity is applied to the STO of the magnetic head, in order to provide an STO frequency that is closer to the frequency of the magnetic disk at track 50. Similarly, when the magnetic head moves to a location above track 60, negative polarity is applied to the STO in order to provide an STO frequency that is closer to the frequency of the magnetic disk at track 60.

Figure 6:
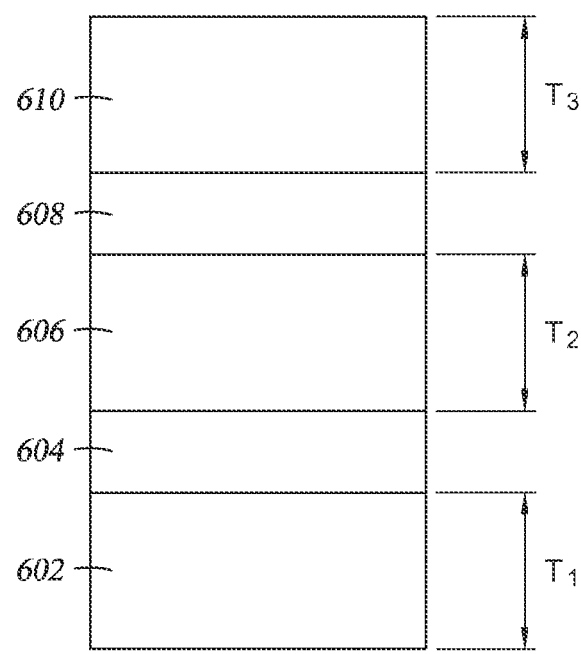
FIG. 6 is a schematic cross sectional side view of an STO according to one embodiment.

FIG. 6 is a schematic cross sectional side view of the STO 230 according to one embodiment. The STO 230 may include a first magnetic layer 602, a first non-magnetic layer 604, a second magnetic layer 606, a second non-magnetic layer 608, and a third magnetic layer 610. The first magnetic layer 602 may be coupled to the trailing shield 240, and the third magnetic layer 610 may be coupled to the main pole 220. In some embodiments, an under layer may be disposed between the first magnetic layer 602 and the trailing shield 240, and a cap layer may be disposed between third magnetic layer 610 and the main pole 220. The first and third magnetic layers 602, 610 may be SPLs, and the second magnetic layer 606 may be an FGL. The STO 230 can oscillate at both positive and negative polarities and achieve different frequencies. For example, the current may be flowed from the main pole 220 to the trailing shield 240, or from the trailing shield 240 to the main pole 220. The first and third magnetic layers 602, 610 may be any suitable magnetic material, such as Co/Ni or alloys thereof. The second magnetic layer 606 may be any suitable magnetic material, such as CoFe or alloys thereof. The first and second non-magnetic layers 604, 608 may be any suitable non-magnetic material, such as Cu.

The first magnetic layer 602 has a first thickness t1, the second magnetic layer 606 has a second thickness t2, and the third magnetic layer 610 has a third thickness t3. The first thickness t1 does not equal to the third thickness t3 such that the difference in t1 and t3 divided by t1 or t3 may range from about 0.1 to about 0.5. In one embodiment, the first thickness t1 is about 3.0 nm, the second thickness t2 is about 10 nm, and the third thickness t3 is about 2.5 nm. Each non-magnetic layer 604, 608 may have a thickness of about 2 nm. The perpendicular anisotropic magnetic fields (Hk) of the first magnetic layer 602 and the third magnetic layer 610 are different such that the different in Hk of the first magnetic layer 602 and the third magnetic layer 610 divided by the Hk of either the first or third magnetic layer 602, 610 may range from about 0.1 to about 0.5. The saturation magnetization (Bs) of the first magnetic layer 602 and the third magnetic layer 610 are different such that the different in Bs of the first magnetic layer 602 and the third magnetic layer 610 divided by the Bs of either the first or third magnetic layer 602, 610 may range from about 0.1 to about 0.5.

In summary, a MAMR enabled magnetic head is disclosed. The MAMR head includes an STO disposed between a main pole and a trailing shield. A current switching system is electronically coupled to the STO and is configured to switch the direction of a current applied to the STO. The current may be flowed from the main pole to the trailing shield or from the trailing shield to the main pole. The STO frequency can be optimized by changing the direction of the current flow, and optimized STO frequency leads to improved writing capability.

While the foregoing is directed to exemplary embodiments, other and further embodiments of the disclosure may be devised without departing from the basic scope thereof, and the scope thereof is determined by the claims that follow.

What is claimed is:

1. A hard disk drive, comprising:
   a magnetic media;
   a magnetic write head, wherein the magnetic write head comprises:
      a main pole;
      a trailing shield; and
      a spin torque oscillator disposed between the main pole and the trailing shield; and
   a circuit electrically coupled to the magnetic write head, wherein the circuit comprises a current switching system electrically coupled to the spin torque oscillator, wherein the circuit further comprises a positive spin torque oscillator circuit electrically coupled to the current switching system and a negative spin torque oscillator circuit electrically coupled to the current switching system.

2. The hard disk drive of claim 1, wherein the circuit further comprises a timer electrically coupled to the current switching system.

3. The hard disk drive of claim 1, wherein the circuit further comprises a servo system electrically coupled to the current switching system.

4. The hard disk drive of claim 1, wherein the circuit further comprises a write circuit electrically coupled to the current switching system.

5. The hard disk drive of claim 1, wherein the circuit further comprises a read signal processor electrically coupled to the servo system.

6. The hard disk drive of claim 5, wherein the circuit further comprises a preamp electrically coupled to the read signal processor.

7. The hard disk drive of claim 6, wherein the circuit further comprises a sensor bias circuit coupled to the preamp.

8. A method, comprising:
   flowing a current to a spin torque oscillator, wherein the current is flowed to the spin torque oscillator in a first direction; and
   changing the flow of the current to the spin torque oscillator, wherein the current is flowed to the spin torque oscillator in a second direction, wherein the second direction is opposite the first direction, wherein the current in the first direction is provided by a positive spin torque oscillator circuit and the current in the second direction is provided by a negative spin torque oscillator circuit.

9. The method of claim 8, wherein the changing the flow of the current to the spin torque oscillator is performed by a current switching system electrically coupled to the spin torque oscillator.

10. The method of claim 9, wherein the changing of the flow of the current to the spin torque oscillator is based on operating time, which is counted by a timer electrically coupled to the current switching system.

11. The method of claim 9, further comprising moving a magnetic head over a surface of a magnetic disk, wherein the surface of the magnetic disk includes a plurality of tracks.

12. The method of claim 11, wherein the changing of the flow of the current to the spin torque oscillator is based on a location of the magnetic head relative to the plurality of tracks.

13. The method of claim 12, wherein the flow of the current to the spin torque oscillator is changed when the magnetic head is moved from a track of the plurality of tracks to another track of the plurality of tracks.

14. A method, comprising:
   flowing a current to a spin torque oscillator disposed between a main pole and a trailing shield, wherein the current is flowed from the main pole to the trialing shield; and
   changing the flow of the current to the spin torque oscillator, wherein the current is flowed to the spin torque oscillator from the trailing shield to the main pole, wherein the current from the main pole to the trailing shield is provided by a positive spin torque oscillator circuit and the current from the trailing shield to the main pole is provided by a negative spin torque oscillator circuit.

15. The method of claim 14, wherein the changing the flow of the current to the spin torque oscillator is performed by a current switching system electrically coupled to the spin torque oscillator.

16. The method of claim 15, wherein the changing of the flow of the current to the spin torque oscillator is based on operating time, which is counted by a timer electrically coupled to the current switching system.

17. The method of claim 15, further comprising moving a magnetic head over a surface of a magnetic disk, wherein the surface of the magnetic disk includes a plurality of tracks.

18. The method of claim 17, wherein the changing of the flow of the current to the spin torque oscillator is based on a location of the magnetic head relative to the plurality of tracks.

19. The method of claim 18, wherein the flow of the current to the spin torque oscillator is changed when the magnetic head is moved from a track of the plurality of tracks to another track of the plurality of tracks.

20. A magnetic head, comprising:
   a main pole;
   a trailing shield;
   a spin torque oscillator disposed between the main pole and the trailing shield, wherein the spin torque oscillator is electrically connected to a current switching system;
   a positive spin torque oscillator circuit electrically connected to the current switching system; and a negative spin torque oscillator circuit electrically connected to the current switching system.

* * * * *